United States Patent [19]
Schnettler et al.

[11] 3,905,980
[45] Sept. 16, 1975

[54] 3-SUBSTITUTED-2,4-DIHYDRO-BENZODIAZEPINES

[75] Inventors: Richard A. Schnettler, Brown Deer; John T. Suh, Mequon, both of Wis.

[73] Assignee: Colgate-Palmolive Company, New York, N.Y.

[22] Filed: Oct. 2, 1974

[21] Appl. No.: 511,490

Related U.S. Application Data

[63] Continuation-in-part of Ser. No. 317,799, Dec. 22, 1972, Pat. No. 3,867,388.

[52] U.S. Cl............................. 260/268 BC; 424/250

[51] Int. Cl.$^2$................ C07D 295/12; C07D 295/18
[58] Field of Search................................ 260/268 BC

*Primary Examiner*—Richard J. Gallagher
*Assistant Examiner*—Jose Tovar
*Attorney, Agent, or Firm*—T. F. Kryshak; M. L. Youngs

[57] ABSTRACT

The 3-substituted-2,4-dihydrobenzodiazepines and their pharmaceutically acceptable acid addition salts are central nervous system depressants. A compound disclosed is 3-[N-(N'-2-thienoylpiperazino)]-4,5-dihydro-1H-2,4-benzodiazepine hydroiodide.

6 Claims, No Drawings

3-SUBSTITUTED-2,4-DIHYDRO-BENZODIAZEPINES

RELATED CASE

This is a continuation-in-part of our earlier application Ser. No. 317,799, filed Dec. 22, 1972, now U.S. Pat. No. 3,867,388, issued Feb. 18, 1975.

DETAILED DESCRIPTION

The compounds of the present invention have the following formula

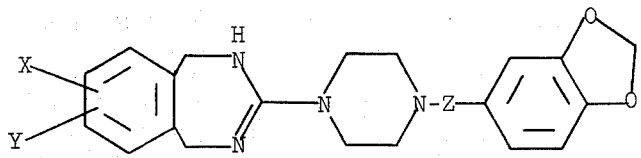

in which X and Y are selected from hydrogen, hydroxy, halogen, CF$_3$, alkyl of 1 to 4 carbon atoms or an alkoxy of 1 to 4 carbon atoms, especially methoxy or ethoxy, and Z is

or

—CH$_2$—.

BACKGROUND OF THE INVENTION

U.S. Pat. Nos. 3,496,179 and 3,609,152 disclose 2-amino-3,4-dihydroquinazolines which are antihypertensive agents. An article by H. R. Rodriguez, et al., *J. Org. Chem.*, 33, 670 (1968), discloses the compound 2-amino-4,5-dihydro-1H-2,4-benzodiazepine, and related compounds are disclosed in U.S. Pat. No. 3,696,093.

PREPARATION OF THE COMPOUNDS

The compounds of the presetn invention are readily prepared from 3-methylmercapto-4,5-dihydro-1H-2,4-benzodiazepines of the formula

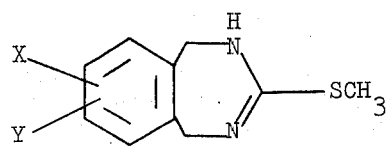

which are known compounds. E. F. Elslager, et al., *J. Het. Chem.*, 5, 609 (1968).

Representative of the compounds that may be used as starting materials are the following:

3-methylmercapto-4,5-dihydro-1H-2,4-benzodiazepine, 3-methylmercapto-7,8-dimethoxy-4,5-dihydro-1H-2,4-benzodiazepine, 3-methylmercapto-7,8-dichloro-4,5-dihydro-1H-2,4-benzodiazepine, and 3-methylmercapto-6-fluoro-4,5-dihydro-1H-2,4-benzodiazepine.

The compounds of the invention are conveniently prepared by dissolving the corresponding 3-methylmercapto-4,5-dihydro-1H-2,4-benzodiazepine hydroiodide and a suitable amine in anhydrous acetonitrile and heating the mixture under reflux conditions until the reaction is complete.

The described process may be illustrated as follows:

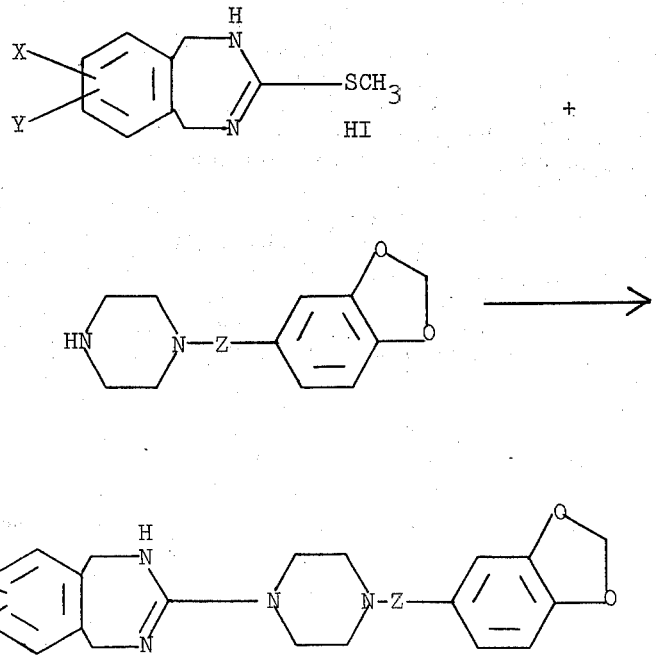

in which R, X and Y are as previously defined.

Among the compounds which may be prepared by the described process are the following:

3-[N-(N'-piperonoylpiperazino)]-4,5-dihydro-1H-2,4-benzodiazepine hydroiodide hydrate, 3-[N-(N'-piperonoylpiperazino)]-7,8-dimethoxy-4,5-dihydro-1H-2,4-benzodiazepine hydroiodide hydrate, 3-[N-(N'-piperonoylpiperazino)]-7,8-dichloro-4,5-dihydro-1H-2,4-benzodiazepine hydroiodide hydrate, 3-[N-(N'-piperonylpiperazino)]-4,5-dihydro-1H-2,4-benzodiazepine hydroiodide, 3-[N-(N'-piperonylpiperazino)]-7,8-dimethoxy-4,5-dihydro-1H-2,4-benzodiazepine hydroiodide, and 3-[N-(N'-piperonylpiperazino)]-7,8-dichloro-4,5-dihydro-1H-2,4-benzodiazepine hydroiodide.

The compounds in which X and/or Y are hydroxy may be readily prepared from the corresponding compounds in which X and Y are aralkoxy or alkoxy by conventional procedures.

Acid addition salts of the compounds of the present invention may be conveniently produced by contacting the free base with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Pat. Nos. 2,425,320 and 2,606,155. The compounds also form fluosilicic acid addition salts which are useful as mothproofing agents according to U.S. Pat. Nos. 1,915,334 and 2,075,359.

The compounds of the invention are pharmacologically active. For example, the compounds 3-[N-(N'-piperonoylpiperazino)]-4,5-dihydro(1H)-2,4-benzodiazepine hydroiodide hydrate and 3-[N-(N'-piperonylpiperazino)]-4,5-dihydro(1H)-2,4-benzodiazepine hydroiodide, when evaluated in mouse behavioral studies at intraperitoneal doses of 30 to 100 mg/kg, were found to produce a central nervous system depression characterized by sedation. The mouse behavioral studies also indicated that the compounds were relatively safe and possessed an $LD_{50}$ in excess of 175 mg/kg of body weight. The behavioral studies were conducted essentially in accordance with the procedure outlined by S. Irwin in "Animal and Clinical Pharmacologic Techniques in Drug Evaluation", J. H. Nodine and P. E. Siegler, Ed., Year Book Medical Publishers, Inc. (1964).

When intended for pharmaceutical use, the compounds are preferably combined with one or more suitable pharmaceutical diluents and additives and formed into unit dosage forms for oral or parenteral administration such as tablets, capsules and solutions. The following examples are presented to illustrate this invention:

EXAMPLE 1

3-[N-(N'-Piperonoylpiperazino)]-4,5-dihydro-1H-2,4-benzodiazepine hydroiodide hydrate A mixture of 9.4 g. (0.04 mole) of N-piperonoylpiperazine and 6.4 g. (0.02 mole) of 3-methylmercapto-4,5-dihydro-1H-2,4-benzodiazepine hydroiodide in 150 ml. of dry acetonitrile is refluxed 16 hours, cooled, the solids filtered and recrystallized from ethanol to afford 3-[N-(N'-piperonoylpiperazino)]-4,5-dihydro-1H-2,4-benzodiazepine hydroiodide hydrate as a white powder, m.p. 179°–181.5°.

Anal. Calcd. for $C_{21}H_{15}IN_4O_4$: C, 48.10; H, 4.81; N, 10.68. Found: C, 48.09; H, 4.53; N, 10.96.

EXAMPLE 2

3-[N-(N'-Carboethoxypiperazino)]-4,5-dihydro-1H-2,4-benzodiazepine hydroiodide

In 100 ml. dry acetonitrile is suspended 8 g. (0.025 mole) 3-methylmercapto-4,5-dihydro-1H-2,4-benzodiazepine hydroiodide and 7.9 g. (0.050 mole) ethyl N-piperazinocarboxylate. The mixture is refluxed 22 hours, cooled, and the solvent evaporated. The residue is triturated with isopropanol and the solid collected. Recrystallization from isopropanol gives 3-[N-(N'-carboethoxypiperazino)]-4,5-dihydro-1H-2,4-benzodiazepine hydroiodide as a white solid, m.p. 202°–202°.

Anal. Calcd. for -benzodiazepine $16H_{23}N_4O_2I$: C, 44.66; H, 5.39; N, 13.02. Found: C, 44.51; H, 5.09; N, 12.80.

EXAMPLE 3

3-[N-(N'-2-Thienylmethylpiperazino)]-4,5-dihydro-1H-2,4-benodiazepine hydroiodide A mixture of 5.4 g. (0.017 mole) of 3-methylmercapto-4,5-dihydro-1H-2,4-benzodiazepine hydroiodide and 6.2 g. (0.034 mole) of N-2-thienylmethylpiperazine in 50 ml. of dry acetonitrile is refluxed for 23 hours. The solvent is evaporated and the residual oil dissolved in hot isopropyl alcohol. The solids are filtered and dried to afford 3-[N-(N'-2-thienylmethylpiperazino)]-4,5-dihydro-1H-2,4-benzodiazepine hydroiodide as a beige powder, m.p. 194°–196°.

Anal. Calcd. for $C_{18}H_{23}IN_4S$: C, 47.58; H, 5.10; N, 12.33. Found: C, 47.13; H, 5.05; N, 12.12.

EXAMPLE 4

3-[N-(N'-Piperonylpiperazino)]-4,5-dihydro-1H-2,4-benzodiazepine hydroiodide

A mixture of 7.5 g. (0.023 mole) of 3-methylmercapto-4,5-dihydro-1H-2,4-benzodiazepine hydroiodide and 10.1 g. (0.046 mole) of N-piperonylpiperazine in 100 ml. of dry acetonitrile is refluxed for 20 hours. The solvent is evaporated and the residual oil triturated under hot isopropyl alcohol. The resulting solids are recrystallized twice from methyl alcohol to afford 3-[N-(N'-piperonylpiperazino)]-4,5-dihydro-1H-2,4-benzodiazepine hydroiodide as white crystals, m.p. 202°–204°.

Anal. Calcd. for $C_{21}H_{25}IN_4O_2$: C, 51.22; H, 5.12; N, 11.38. Found: C, 51.58; H, 5.16; N, 11.18.

We claim:

1. A compound selected from a compound of the formula

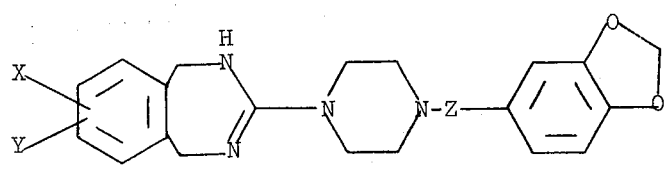

and pharmaceutically acceptable salts thereof, in which X and Y are hydrogen, hydroxy, halogen, or $CF_3$, lower alkoxy of 1 to 4 carbon atoms, and Z is

or

2. A compound of claim 1 in which X and Y are hydrogen or methoxy.

3. A compound of claim 1 in which X and Y are methoxy.

4. A compound of claim 1 in which X and Y are hydrogen.

5. The compound of claim 1 which is 3-[N-(N'-piperonylpiperazino)]-4,5-dihydro-1H-2,4-benzodiazepine hydroiodide hydrate.

6. The compound of claim 1 which is 3-[N-(N'-piperonylpiperazino)]-4,5-dihydro-1H-2,4-benzodiazepine hydroiodide.

* * * * *

UNITED STATES PATENT OFFICE
CERTIFICATE OF CORRECTION

PATENT NO. : 3,905,980
DATED : September 16, 1975
INVENTOR(S) : Richard A. Schnettler and John T. Suh It is certified that error appears in the above-identified patent and that said Letters Patent are hereby corrected as shown below:

Column 4, line 24, "for -benzodiazepine $16H_{23}N_4O_2I$:" should read "for $16H_{23}N_4O_2I$:". Column 6, claim 5, line 2, "piperonylpiperazino" should read "piperonoylpiperazino".

Signed and Sealed this

*thirtieth* Day of *December 1975*

[SEAL]

Attest:

RUTH C. MASON
*Attesting Officer*

C. MARSHALL DANN
*Commissioner of Patents and Trademarks*